(12) United States Patent
Mizrahi et al.

(10) Patent No.: US 9,135,015 B1
(45) Date of Patent: Sep. 15, 2015

(54) RUN-TIME CODE PARALLELIZATION WITH MONITORING OF REPETITIVE INSTRUCTION SEQUENCES DURING BRANCH MIS-PREDICTION

(71) Applicant: Centipede Semi Ltd., Netanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 0 days.

(21) Appl. No.: 14/583,119

(22) Filed: Dec. 25, 2014

(51) Int. Cl.
*G06F 7/38* (2006.01)
*G06F 9/00* (2006.01)
*G06F 9/44* (2006.01)
*G06F 9/38* (2006.01)
*G06F 9/30* (2006.01)

(52) U.S. Cl.
CPC .......... *G06F 9/3861* (2013.01); *G06F 9/30058* (2013.01); *G06F 9/3822* (2013.01)

(58) Field of Classification Search
None
See application file for complete search history.

(56) References Cited

U.S. PATENT DOCUMENTS

| | | | |
|---|---|---|---|
| 5,488,729 A | 1/1996 | Vegesna et al. | |
| 5,488,730 A * | 1/1996 | Brown et al. | 712/41 |
| 5,966,537 A | 10/1999 | Ravichandran | |
| 5,974,538 A | 10/1999 | Wilmot, II | |
| 6,035,120 A | 3/2000 | Ravichandran | |
| 6,092,180 A | 7/2000 | Anderson et al. | |
| 6,157,998 A | 12/2000 | Rupley, II et al. | |
| 6,182,210 B1 | 1/2001 | Akkary et al. | |
| 6,202,205 B1 | 3/2001 | Saboff et al. | |
| 6,308,175 B1 | 10/2001 | Lang et al. | |
| 6,463,522 B1 | 10/2002 | Akkary | |
| 6,493,820 B2 | 12/2002 | Akkary et al. | |
| 6,516,409 B1 | 2/2003 | Sato | |
| 6,658,447 B2 | 12/2003 | Cota-Robles | |
| 6,772,324 B2 | 8/2004 | Akkary et al. | |
| 6,826,752 B1 | 11/2004 | Thornley et al. | |
| 7,313,675 B2 | 12/2007 | Latorre et al. | |
| 7,313,676 B2 | 12/2007 | Brekelbaum et al. | |
| 7,366,880 B2 | 4/2008 | Chaudhry et al. | |
| 7,401,329 B2 | 7/2008 | De Rijck | |
| 7,478,198 B2 | 1/2009 | Latorre et al. | |
| 7,526,637 B2 | 4/2009 | Jung et al. | |

(Continued)

FOREIGN PATENT DOCUMENTS

EP 2239657 B1 11/2012

OTHER PUBLICATIONS

Patel et al.; rePLay: A Hardware Framework for Dynamic Optimization; 2001; IEEE.*

(Continued)

*Primary Examiner* — Corey S Faherty
(74) *Attorney, Agent, or Firm* — D. Kligler I.P. Services Ltd.

(57) ABSTRACT

A method includes, in a processor that executes instructions of program code, monitoring the instructions in a segment of a repetitive sequence of the instructions so as to construct a specification of register access by the monitored instructions. In response to detecting a branch mis-prediction in the monitored instructions, the specification is corrected so as to compensate for the branch mis-prediction. Execution of the repetitive sequence is parallelized based on the corrected specification.

30 Claims, 2 Drawing Sheets

(56) References Cited

U.S. PATENT DOCUMENTS

| | | | |
|---|---|---|---|
| 7,596,781 B2 | 9/2009 | Fulton et al. | |
| 7,779,069 B2 | 8/2010 | Frid-Nielsen et al. | |
| 7,882,381 B2 | 2/2011 | Wyatt | |
| 8,006,235 B2 | 8/2011 | Broman et al. | |
| 8,196,117 B2 | 6/2012 | Lafrance-Linden | |
| 8,261,046 B2 | 9/2012 | Gibert et al. | |
| 8,291,197 B2 | 10/2012 | Wu et al. | |
| 8,438,370 B1 | 5/2013 | Budge | |
| 8,667,471 B2 | 3/2014 | Wintergerst et al. | |
| 8,677,337 B2 | 3/2014 | Song et al. | |
| 8,719,806 B2 | 5/2014 | Wang et al. | |
| 8,843,901 B2 | 9/2014 | Krajec et al. | |
| 2002/0144092 A1 | 10/2002 | Topham et al. | |
| 2004/0073906 A1 | 4/2004 | Chamdani et al. | |
| 2004/0098570 A1 | 5/2004 | Giri | |
| 2004/0154010 A1 | 8/2004 | Marcuello et al. | |
| 2004/0193857 A1 | 9/2004 | Miller et al. | |
| 2006/0047495 A1 | 3/2006 | Sanchez et al. | |
| 2006/0095732 A1 | 5/2006 | Tran et al. | |
| 2006/0227966 A1 | 10/2006 | Knowles | |
| 2008/0134196 A1 | 6/2008 | Madriles et al. | |
| 2008/0162272 A1 | 7/2008 | Huang et al. | |
| 2008/0163230 A1 | 7/2008 | Latorre et al. | |
| 2008/0167846 A1 | 7/2008 | Bugenhagen | |
| 2008/0320276 A1 | 12/2008 | Krottendorfer et al. | |
| 2009/0228690 A1 | 9/2009 | Muff et al. | |
| 2009/0327674 A1 | 12/2009 | Codrescu et al. | |
| 2010/0269102 A1 | 10/2010 | Latorre et al. | |
| 2011/0161643 A1 | 6/2011 | Eichenberger et al. | |
| 2011/0167247 A1 | 7/2011 | Gibbs et al. | |
| 2011/0320787 A1 | 12/2011 | Dieffenderfer et al. | |
| 2012/0079146 A1 | 3/2012 | Hesse | |
| 2013/0125097 A1 | 5/2013 | Ebcioglu et al. | |
| 2013/0232476 A1 | 9/2013 | Varma et al. | |
| 2014/0019726 A1 | 1/2014 | Toi et al. | |
| 2014/0281435 A1 | 9/2014 | Perkins et al. | |
| 2014/0282592 A1 | 9/2014 | Abdallah | |
| 2014/0282601 A1 | 9/2014 | Abdallah | |
| 2014/0317387 A1 | 10/2014 | Abdallah | |

OTHER PUBLICATIONS

Shen et al.; Modern Processing Design: Fundamentals of Superscalar Processors; 2002; McGraw-Hill.*

Ortiz-Arroyo et al., "Dynamic Simultaneous Multithreaded Architecture", Proceedings of ISCA's 16th International Conference on Parallel and Distributed Computing Systems (PDCS'03), 9 pages, year 2003.

Ortiz-Arroyo, D.,"Efficient Resource Allocation on a Dynamic Simultaneous Multithreaded Architecture", Computer Science and Engineering Department, Aalborg University, Denmark, 5 pages, year 2006.

Marcuello et al., "A Quantitative Assessment of Thread-Level Speculation Techniques", Proceedings of the 14th International Parallel and Distributed Processing Symposium, pp. 595-601, May 1-5, 2000.

Marcuello et al., "Thread-Spawning Schemes for Speculative Multithreading", Proceedings of the Eighth International Symposium on High-Performance Computer Architecture (HPCO2), pp. 55-64, Feb. 2-6, 2002.

Marcuello et al., "Clustered Speculative Multithreaded Processors", Proceedings of the 13th international conference on Supercomputing (ICS '99), pp. 365-372, year 1999.

Marcuello et al., "Speculative Multithreaded Processors", Proceedings of the 12th international conference on Supercomputing (ICS '98), pp. 77-84, year 1998.

Cazorla et al., "Dynamically Controlled Resource Allocation in SMT Processors", Proceedings of the 37th International Symposium on Microarchitecture (MICRO-37'04), pp. 171-182, year 2004.

Akkary et al., "A Dynamic Multithreading Processor", Proceedings of the 31st annual ACM/IEEE international symposium on Microarchitecture (MICRO-31), pp. 226-236, Dec. 2, 1998.

Ranjan et al., "P-Slice Based Efficient Speculative Multithreading", International Conference on High Performance Computing (HiPC), pp. 119-128, Dec. 16-19, 2009.

Sohi et al., "Speculative Multithreaded Processors", IEEE Computer, vol. 34, issue 4, pp. 66-73, Apr. 2001.

Sohi et al., "Speculative Multithreaded Processors", Computer Sciences Department, University of Wisconsin—Madison, year 2001.

Roth et al., "Register Integration: A Simple and Efficient Implementation of Squash Reuse", Proceedings of the 33rd Annual International Symposium on Microarchitecture (MICRO-33), 12 pages, Dec. 10-13, 2000.

Roth, A., "Pre-Execuion via Speculative Data-Driven Multithreading", A dissertation submitted in partial fulfillment of the requirements for the degree of Doctor of Philosophy (Computer Sciences), University of Wisconsin Madison, 375 pages, year 2001.

Jacobson et al., "Path-Based Next Trace Prediction", Proceedings of Micro-30, 11 pages, Dec. 1-3, 1997.

Tubella et al., "Control Speculation in Multithreaded Processors through Dynamic Loop Detection", Proceedings of the 4th International High-Performance Computer Architecture Symposium, pp. 14-23, Feb. 1-4, 1998.

Zier et al., "Performance Evaluation of Dynamic Speculative Multithreading with the Cascadia Architecture", IEEE Transactions on Parallel and Distributed Systems, vol. 21, No. 1, pp. 47-59, Jan. 2010.

Zier, "The Dynamic Speculation and Performance Prediction of Parallel Loops", Dissertation for the degree of Doctor of Philosophy in Electrical and Computer Engineering, Oregon State University, 146 pages, May 1, 2009.

De Alba et al., "Characterization and Evaluation of Hardware Loop Unrolling", Boston Area Architecture Workshop (BARC-2003), 18 pages, Jan. 2003.

Collins et al., "Clustered Multithreaded Architectures-Pursuing Both IPC and Cycle Time", Proceedings of the 18th International Parallel and Distributed Processing Symposium, 10 pages, Apr. 2004.

Mizrahi et al., U.S. Appl. No. 14/578,518, filed Dec. 22, 2014.

Mizrahi et al., U.S. Appl. No. 14/578,516, filed Dec. 22, 2014.

U.S. Appl. No. 14/637,418 Office Action dated May 28, 2015.

Moseley et al., "Identifying potential parallelism via loop-centric profiling", ACM, 9 pages, May 7-9, 2007.

U.S. Appl. No. 14/578,516 Office Action dated May 21, 2015.

U.S. Appl. No. 14/578,518 Office Action dated Jun. 19, 2015.

* cited by examiner

| Code in instructions | Dependencies between instructions |
|---|---|
| 1 mov r9, r2 | 1,2,3 depend on 3 from previous iteration |
| 2 ldrb r0, [r2] | 4 depends on 2 |
| 3 strb ip, [r2], #1 | 6 depends on 2 |
| 4 cmp r5, r0 | 3 depends on 6 from previous iteration |
| 5 beq outside_loop | |
| 6 mov ip, r0 | |
| 7 b 1 | |

| Cycles | TH1 | TH2 | TH3 | TH4 |
|---|---|---|---|---|
| 0 | 11,12,13 | | | |
| 1 | | 21,22 | | |
| 2 | | | | |
| 3 | | | | |
| 4 | 14,16 | | | |
| 5 | | 23,24,26 | | |
| 6 | | | 31,32,33 | |
| 7 | | | | 41,42 |
| 8 | | | | |
| 9 | | | | |
| 10 | | | 34,36 | |
| 11 | | | | 43,44,46 |

Two iterations in 6 cycles (average of 3 cycles/iteration)

RUN-TIME CODE PARALLELIZATION WITH MONITORING OF REPETITIVE INSTRUCTION SEQUENCES DURING BRANCH MIS-PREDICTION

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the $31^{st}$ Annual International Symposium on Microarchitectures, December, 1998, which is incorporated herein by reference.

Marcuellu et al., describe a processor microarchitecture that simultaneously executes multiple threads of control obtained from a single program by means of control speculation techniques that do not require compiler or user support, in "Speculative Multithreaded Processors," Proceedings of the $12^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the $13^{th}$ International Conference on Supercomputing, 1999, which is incorporated herein by reference.

In "A Quantitative Assessment of Thread-Level Speculation Techniques," Proceedings of the $14^{th}$ International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the $16^{th}$ International Conference on Parallel and Distributed Computing Systems (PDCS'03), 2003, which is incorporated herein by reference.

SUMMARY OF THE INVENTION

An embodiment of the present invention that is described herein provides a method including, in a processor that executes instructions of program code, monitoring the instructions in a segment of a repetitive sequence of the instructions so as to construct a specification of register access by the monitored instructions. In response to detecting a branch mis-prediction in the monitored instructions, the specification is corrected so as to compensate for the branch mis-prediction. Execution of the repetitive sequence is parallelized based on the corrected specification.

In some embodiments, monitoring the instructions further includes generating a flow-control trace traversed by the monitored instructions, and the method includes correcting the flow-control trace so as to compensate for the branch mis-prediction. In an embodiment, the method includes continuing monitoring the instructions during parallelized execution. In an embodiment, the method includes continuing to monitor the instructions and construct the specification after correcting the specification. In an example embodiment, correcting the specification includes terminating monitoring of the instructions of the segment and discarding at least part of the specification of the register access collected in the segment.

In some embodiments, correcting the specification includes rolling-back the specification, based on the instructions following the branch mis-prediction, to a previous state corresponding to an instruction at or prior to a branch instruction in which the branch mis-prediction occurred. In an embodiment, monitoring the instructions includes recording in the specification a location in the sequence of a last write operation to a register, and rolling-back the specification includes correcting the location of the last write operation. In an example embodiment, recording the location of the last write operation includes incrementing a count of write operations to the register, and correcting the location includes decrementing the count to a value corresponding to the branch instruction in which the branch mis-prediction occurred.

In a disclosed embodiment, monitoring the instructions includes recording in the specification a classification of registers accessed by the monitored instructions, and correcting the specification includes re-classifying one or more of the registers so as to compensate for the branch mis-prediction.

In some embodiments, monitoring the instructions includes saving one or more states of the specification at or prior to one or more respective branch instructions along the monitored segment, and correcting the specification includes reverting to a saved state corresponding to an instruction at or prior to a branch instruction in which the branch mis-prediction occurred.

Saving the states may include saving the states only for a partial subset of the branch instructions along the monitored segment. The method may include selecting the partial subset of the branch instructions in accordance with a directive in the program code or from a compiler of the program code, and/or based on a criterion evaluated at runtime.

In some embodiments, monitoring the instructions includes generating a flow-control trace of the monitored instructions based on branch instructions being fetched from memory in an execution pipeline of the processor, based on branch instructions being decoded in an execution pipeline of the processor, and/or based jointly on branch instructions being fetched from memory, and on the branch instructions being decoded, in an execution pipeline of the processor.

In some embodiments monitoring the instructions includes recording in the specification a location in the sequence of a last write operation to a register, based on the instructions being decoded in an execution pipeline of the processor, based on the instructions being executed in an execution pipeline of the processor, and/or based on the instructions that are committed and are not flushed due to the branch mis-prediction.

In an embodiment, monitoring the instructions includes collecting the register access only after evaluating respective branch conditions of conditional branch instructions of the sequence. In another embodiment, monitoring the instructions includes generating a flow-control trace for the monitored instructions, including for a branch instruction that is not known to a branch prediction unit of the processor.

There is additionally provided, in accordance with an embodiment of the present invention, a processor including an execution pipeline and a monitoring unit. The execution pipeline is configured to execute instructions of program code. The monitoring unit is configured to monitor the instructions in a segment of a repetitive sequence of the instructions so as to construct a specification of register access by the monitored instructions, to correct the specification in response to detecting a branch mis-prediction in the monitored instructions so as to compensate for the branch mis-prediction, and to parallelize execution of the repetitive sequence based on the corrected specification. The present invention will be more fully understood from the following detailed description of the embodiments thereof, taken together with the drawings in which:

DETAILED DESCRIPTION OF EMBODIMENTS

Overview

Figures 1, 2:
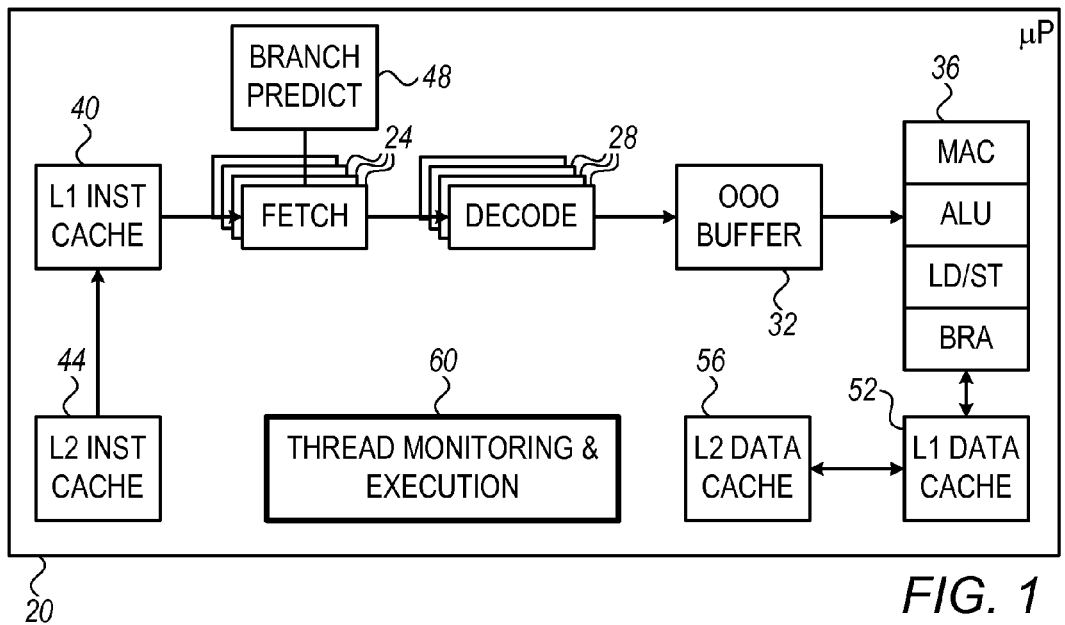
FIG. 1 is a block diagram that schematically illustrates a processor that performs run-time code parallelization, in accordance with an embodiment of the present invention.
FIG. 2 is a diagram that schematically illustrates run-time parallelization of a program loop, in accordance with an embodiment of the present invention.

Embodiments of the present invention that are described herein provide improved methods and devices for run-time parallelization of code in a processor. In the disclosed embodiments, the processor identifies a repetitive sequence of instructions, and creates and executes multiple parallel code sequences referred to as segments, which carry out different occurrences of the sequence. The segments are scheduled for parallel execution by multiple hardware threads.

For example, the repetitive sequence may comprise a loop, in which case the segments comprise multiple loop iterations, parts of an iteration or the continuation of a loop. As another example, the repetitive sequence may comprise a function, in which case the segments comprise multiple function calls, parts of a function or function continuation. The parallelization is carried out at run-time, on pre-compiled code. The term "repetitive sequence" generally refers to any instruction sequence that is revisited and executed multiple times.

In some embodiments, upon identifying a repetitive sequence, the processor monitors the instructions in the sequence and constructs a "scoreboard"—A specification of access to registers by the monitored instructions. The scoreboard is associated with the specific flow-control trace traversed by the monitored sequence. The processor decides how and when to create and execute the multiple segments based on the information collected in the scoreboard and the trace.

Further aspects of instruction monitoring are addressed in a U.S. patent application Ser. No. 14/578,516 entitled "Run-time code parallelization with continuous monitoring of repetitive instruction sequences," and a U.S. patent application Ser. No. 14/578,518 entitled "Register classification for run-time code parallelization," which are assigned to the assignee of the present patent application and whose disclosures are incorporated herein by reference.

In some embodiments, the processor fetches and processes instructions in its execution pipeline. Branch mis-prediction may occur when a conditional branch instruction is predicted to take a branch but during actual execution the branch is not taken, or vice versa. Upon detecting branch mis-prediction, the processor typically flushes the subsequent instructions and respective results.

When branch mis-prediction occurs in a segment whose instructions are being monitored, the register-access information in the scoreboard will typically be incorrect or at least incomplete. Some embodiments described herein provide techniques for correcting the register-access information collected in the scoreboard after detecting a branch mis-prediction event.

In an example embodiment, the processor stops monitoring of the segment in question and discards the register-access information collected in it. In other embodiments, the processor rolls-back the scoreboard to the state prior to the mis-prediction, and continues to monitor the segment following the correct branch decision.

The processor may roll-back the scoreboard in various ways, such as by saving in advance the states of the scoreboard prior to conditional branch instructions, and reverting to a previously-saved state when needed. Alternatively, the processor may roll-back the scoreboard by tracing back the instructions that follow the mis-prediction and decrementing the register-access counters back to their values prior to the mis-prediction. Rolling-back may be carried out for all conditional branch instructions, or only for a selected subset of the conditional branch instructions. Example criteria for selecting the subset are also described.

In some embodiments, as part of the monitoring process, the processor generates the flow-control trace to be associated with the scoreboard. Upon detecting mis-prediction, the processor typically corrects the generated flow-control trace, as well, using any of the methods described above.

In other disclosed embodiments, the processor reduces the impact of mis-prediction by proper choice of the execution-pipeline stage at which the flow-control trace is generated, and the execution-pipeline stage at which the register-access information is collected.

In various embodiments, the processor may generate the trace from the instructions immediately after fetching, immediately after decoding, or a combination of the two.

The register-access information may be collected, for example, immediately after decoding, after execution (including execution of mis-predicted instructions that will be flushed), or after committing (including only instructions that will not be flushed).

System Description

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and decoded.

In the present example, processor 20 comprises an execution pipeline that comprises one or more fetching units 24, one or more decoding units 28, an Out-of-Order (OOO) buffer 32, and execution units 36. Fetching units fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 which new instructions are to be fetched. The flow-control predictions of unit 48 also affect the parallelization of code execution, as will be explained below.

Instructions decoded by decoding units 28 are stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU), one or more Load/Store units, and a branch execution unit (BRA). Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a thread monitoring and execution unit 60 that is responsible for run-time code parallelization. The functions of unit 60 are explained in detail below.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable microarchitecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization Based on Segment Monitoring

In some embodiments, unit 60 in processor 20 identifies repetitive instruction sequences and parallelizes their execution. Repetitive instruction sequences may comprise, for example, respective iterations of a program loop, respective occurrences of a function or procedure, or any other suitable sequence of instructions that is revisited and executed multiple times. In the present context, the term "repetitive instruction sequence" refers to an instruction sequence whose flow-control trace (e.g., sequence of PC values) has been executed in the past at least once. Data values (e.g., register values) may differ from one execution to another.

In the disclosed embodiments, processor 20 parallelizes a repetitive instruction sequence by invoking and executing multiple code segments in parallel or semi-parallel using multiple hardware threads. Each thread executes a respective code segment, e.g., a respective iteration of a loop, multiple (not necessarily successive) loop iterations, part of a loop iteration, continuation of a loop, a function or part or continuation thereof, or any other suitable type of segment.

Parallelization of segments in processor 20 is performed using multiple hardware threads. In the example of FIG. 1, although not necessarily, each thread comprises a respective fetch unit 24 and a respective decoding unit 28 that have been assigned by unit 60 to perform one or more segments. In another example embodiment, a given fetch unit 24 is shared between two or more threads.

In practice, data dependencies exist between segments. For example, a calculation performed in a certain loop iteration may depend on the result of a calculation performed in a previous iteration. The ability to parallelize segments depends to a large extent on such data dependencies.

FIG. 2 is a diagram that demonstrates run-time parallelization of a program loop, in accordance with an example embodiment of the present invention. The present example refers to parallelization of instructions, but the disclosed technique can be used in a similar manner for parallelizing micro-ops, as well. The top of the figure shows an example program loop (reproduced from the bzip benchmark of the SPECint test suite) and the dependencies between instructions. Some dependencies are between instructions in the same loop iteration, while others are between an instruction in a given loop iteration and an instruction in a previous iteration.

The bottom of the figure shows how unit 60 parallelizes this loop using four threads TH1 . . . TH4, in accordance with an embodiment of the present invention. The table spans a total of eleven cycles, and lists which instructions of which threads are executed during each cycle. Each instruction is represented by its iteration number and the instruction number within the iteration. For example, "14" stands for the $4^{th}$ instruction of the $1^{st}$ loop iteration. In this example instructions 5 and 7 are neglected and perfect branch prediction is assumed.

The staggering in execution of the threads is due to data dependencies. For example, thread TH2 cannot execute instructions 21 and 22 (the first two instructions in the second loop iteration) until cycle 1, because instruction (the first instruction in the second iteration) depends on instruction 13 (the third instruction of the first iteration). Similar dependencies exist across the table. Overall, this parallelization scheme is able to execute two loop iterations in six cycles, or one iteration every three cycles.

It is important to note that the parallelization shown in FIG. 2 considers only data dependencies between instructions, and does not consider other constraints such as availability of execution units. Therefore, the cycles in FIG. 2 do not necessarily translate directly into respective clock cycles. For example, instructions that are listed in FIG. 2 as executed in a given cycle may actually be executed in more than one clock cycle, because they compete for the same execution units 36.

In some embodiments, unit 60 decides how to parallelize the code by monitoring the instructions in the processor pipeline. In response to identifying a repetitive instruction sequence, unit 60 starts monitoring the sequence as it is fetched, decoded and executed by the processor.

In some implementations, the functionality of unit may be distributed among the multiple hardware threads, such that a given thread can be viewed as monitoring its instructions during execution. Nevertheless, for the sake of clarity, the description that follows assumes that monitoring functions are carried out by unit 60.

As part of the monitoring process, unit 60 generates the flow-control trace traversed by the monitored instructions, and a monitoring table that is referred to herein as a scoreboard. The scoreboard of a segment typically comprises some classification of the registers. In addition, for at least some of the registers, the scoreboard indicates the location in the monitored sequence of the last write operation to the register.

Any suitable indication may be used to indicate the location of the last write operation, such as a count of the number of writes to the register or the address of the last write operation. The last-write indication enables unit 60 to determine, for example, when it is permitted to execute an instruction in a subsequent segment that depends on the value of the register. Additional aspects of scoreboard generation can be found in U.S. patent applications Ser. Nos. 14/578,516 and 14/578,518, cited above.

Handling Branch Mis-Prediction During Segment Monitoring

In some embodiments, processor 20 fetches and processes instructions speculatively, based on a prediction of the branch decisions that will be takes at future branch instructions. Branch prediction is carried out by branch prediction unit 48, and affects the instructions that are fetched for execution by fetch units 24.

Depending on the actual code and on the performance of unit 48, branch prediction may be erroneous. An event in which a conditional branch was predicted to take a branch but in fact the branch was not taken, or vice versa, is referred to herein as branch mis-prediction, or simply mis-prediction for brevity. In an embodiment of FIG. 1, the branch execution unit (BRA) compares the branch prediction to the actual branch decision and outputs a mis-prediction indication in case of a mismatch.

As noted above, in some embodiments monitoring unit monitors the flow-control trace and the register access during execution. In other embodiments unit 60 may monitor the flow-control trace and the register access in various segments simultaneously during parallel execution. When mis-prediction occurs in a segment being monitored, the resulting trace and scoreboard will typically be incorrect. For example, the scoreboard may comprise register-access information that was collected over instructions that follow the mis-predicted branch and will later be flushed.

In some embodiments, unit 60 takes various measures for correcting the scoreboard in the event of mis-prediction. The correction methods described below refer mainly to correction of the register-access information. In some embodiments, unit 60 uses these methods to correct the generated flow-control trace as well.

In some embodiments, in response to a detected mis-prediction event, unit 60 stops monitoring of the segment and discards the register-access information collected so far in the segment. Monitoring will typically be re-attempted in another segment.

In other embodiments, unit 60 does not discard the register-access information, but rather rolls-back the register-access information to its state prior to the mis-prediction. After rolling back, unit 60 may resume the monitoring process along the correct trace.

Unit 60 may roll-back the scoreboard information in various ways. In some embodiments, unit 60 traces back over the instructions that follow the mis-prediction, and corrects the register-access information to remove the contribution of these instructions. For example, if the register-access information comprises counts of write operations to registers, unit 60 may decrement the counts to remove the contribution of write operations that follow the mis-prediction. If the register-access information comprises some other indications of the locations of the last write operations to registers, unit 60 may correct these indications, as well.

In alternative embodiments, unit 60 prepares in advance for a possible roll-back of the scoreboard to a conditional branch instruction, by saving the state that the scoreboard had prior to that instruction. If mis-prediction occurs in this instruction, unit 60 may revert to the saved state of the scoreboard and resume monitoring from that point. The saved state of the scoreboard typically comprises the register-access information and the register classification prior to the branch instruction. The state may correspond to the exact conditional branch instruction, to the preceding instruction, or to another suitable instruction that is prior to the conditional branch instruction.

In some embodiments, unit 60 saves the scoreboard state prior to every conditional branch instruction, enabling roll-back following any mis-prediction. In alternative embodiments, unit 60 saves the scoreboard state for only a selected subset of the conditional branch instructions in the segment. This technique reduces memory space, but on the other hand enables roll-back for only some of the possible mis-predictions. If mis-prediction occurs in an instruction for which no prior scoreboard state has been saved, unit 60 typically has to abort monitoring the segment and re-attempt monitoring in another segment.

Unit 60 may select the subset of conditional branch instructions (for which the prior state of the scoreboard is saved) using any suitable criterion. Typically, the criterion aims to select conditional branch instructions that are likely to be mis-predicted, and exclude conditional branch instructions that are likely to be predicted correctly. In one embodiment, the subset to be selected is specified in the code or by a compiler that compiles the code. In another embodiment, the subset is chosen by unit 60 at runtime. For example, unit 60 may accumulate mis-prediction statistics and select conditional branch instructions in which branch prediction accuracy is below a certain level.

The embodiments described above refer mainly to correction of the last-write indications in the scoreboard following mis-prediction. Additionally or alternatively, unit 60 may correct any other suitable register access information in the scoreboard that may be affected by mis-prediction. For example, the scoreboard typically comprises a classification of the registers accessed by the monitored instructions based on the order in which the register is used as an operand or as a destination in the monitored instructions. The classification may distinguish, for example, between local (L) registers whose first occurrence is as a destination, global (G) registers that are used only as operands, and global-local (GL) registers whose first occurrence is as operands and are subsequently used as destinations.

In some embodiments, unit 60 may re-classify one or more of the registers so as to reflect their correct classification prior to the mis-prediction. Any of the correction methods described above (e.g., reverting to previously-saved states or tracing back the instruction sequence) can be used for this purpose.

The embodiments described above are depicted purely by way of example. In alternative embodiments, unit 60 may correct the scoreboard in response to branch mis-prediction in any other suitable way.

For example, in some embodiments unit 60 performs only an approximate correction of the specification that only approximately compensates for the effect of the mis-prediction. In these embodiments, unit 60 may roll back the specification to a state that approximates the state prior to the mis-prediction, rather than to the exact prior state. The approximation may comprise, for example, an approximation of the last-write indications of certain registers. In the present context, both exact and approximate corrections are considered types of specification corrections, and both exact and approximate compensation for the mis-prediction are considered types of compensation.

Figure 3:
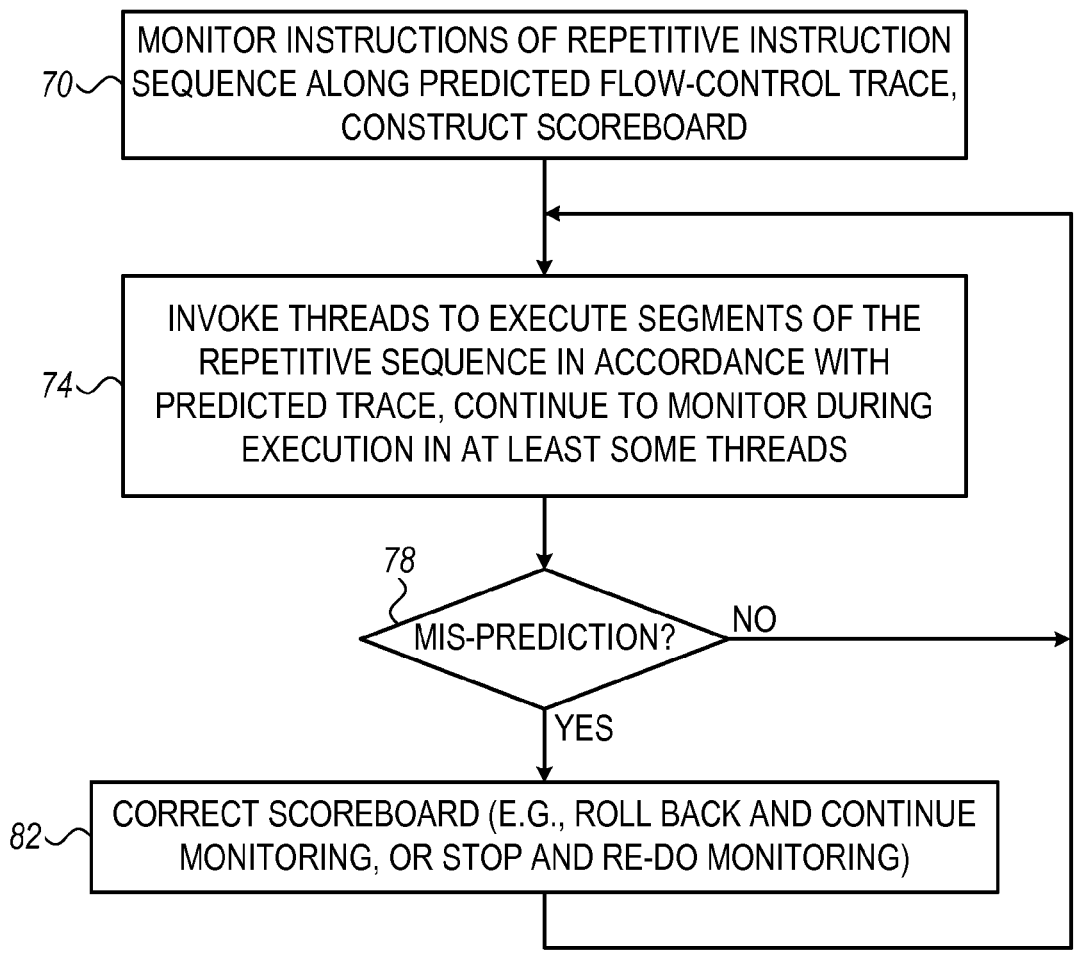
FIG. 3 is a flow chart that schematically illustrates a method for mitigating branch mis-prediction during monitoring of a repetitive instruction sequence, in accordance with an embodiment of the present invention.

FIG. 3 is a flow chart that schematically illustrates a method for mitigating branch mis-prediction during monitoring of a repetitive instruction sequence, in accordance with an embodiment of the present invention. The method begins with unit 60 of processor 20 monitoring instructions of a repetitive instruction sequence, at a monitoring step 70. As part of the monitoring process, in some embodiments unit 60 generates the predicted flow-control trace traversed by the instructions and the corresponding scoreboard.

At an invocation step 74, unit 60 invokes multiple hardware threads to execute respective segments of the repetitive instruction sequence. For at least some of the segments, unit 60 continues to monitor the instructions during execution in the threads.

At a mis-prediction detection step 78, processor 20 checks whether branch mis-prediction has occurred in a given segment being executed. If no mis-prediction is encountered, the method loops back to step 74 above.

In case of branch mis-prediction, unit 60 corrects the scoreboard to compensate for the effect of the instructions following the mis-prediction, at a correction step 82. Unit 60 may use any of the techniques described above, or any other suitable technique, for this purpose. In some embodiments, the correction involves correction of the register-access information as well as correction of the generated flow-control trace.

Pipeline Considerations in Mitigating Branch Mis-Prediction

In some embodiments, unit 60 reduces the impact of branch mis-prediction by properly choosing the stage in the execution pipeline at which the trace is generated and the stage in the execution pipeline at which the register-access information is collected. Generally, trace generation and collection of register-access information need not be performed at the same pipeline stage.

In some embodiments, unit 60 generates the trace from the branch instructions being fetched, i.e., based on the branch instructions at the output of fetching units 24. In alternative embodiments, unit 60 generates the trace from the branch instructions being decoded, i.e., based on the branch instructions at the output of decoding units 28.

In yet another embodiment, unit 60 generates the trace based on a combination of branch instructions at the output of decoding units 28, and branch instructions at the output of fetch units 24.

In some embodiments, unit 60 collects the register-access information (e.g., classification of registers and locations of last write operations to registers) at the output of decoding units 28, i.e., from the instructions being decoded.

In other embodiments, unit 60 collects the register-access information based on the instructions being executed in execution units 36, but before the instructions and results are finally committed. In this embodiment, the register-access information includes the contribution of instructions that follow mis-prediction and will later be flushed (as in the case of collecting the register-access information after the decoding unit). In an alternative embodiment, unit 60 collects the register-access information based only on the instructions that are committed, i.e., without considering instructions that are flushed due to mis-prediction.

In yet another embodiment, unit 60 collects the register-access information and/or generates the trace after evaluating the conditions of conditional branch instructions by the branch execution unit, i.e., at a stage where the branch instructions are no longer conditional.

Further additionally or alternatively, unit 60 may generate the flow-control trace and/or collect the register-access information based on any other suitable pipeline stages.

Generally speaking, monitoring instructions early in the pipeline helps to invoke parallel execution more quickly and efficiently, but on the other hand is more affected by mis-prediction. Monitoring instructions later in the pipeline causes slower parallelization, but is on the other hand less sensitive to mis-prediction.

In some embodiments, unit 60 is able to generate a trace even monitoring a conditional branch instruction that is not yet known to branch prediction unit 48. This scenario may occur, for example, when a repetitive instruction sequence is first encountered and not yet identified as repetitive. Nevertheless, the trace is still recorded by the decoding unit (or by a register-renaming unit), and unit 60 may still be able to generate a trace. Typically, the trace will be generated with a branch not taken for this instruction.

It will be appreciated that the embodiments described above are cited by way of example, and that the present invention is not limited to what has been particularly shown and described hereinabove. Rather, the scope of the present invention includes both combinations and sub-combinations of the various features described herein, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method, comprising:
in a processor that executes instructions of program code, monitoring a repetitive sequence of the instructions that exhibits a constant, recurring register access, and constructing a specification that specifies the recurring register access;

in response to detecting a branch mis-prediction in the monitored instructions, rolling-back the recurring register access specified in the specification so as to compensate for a deviation in the recurring register access caused by the branch mis-prediction; and parallelizing execution of at least some of the instructions based on the specification having the rolled-back recurring register access.

2. The method according to claim 1, wherein monitoring the instructions further comprises generating a flow-control trace traversed by the monitored instructions, and comprising correcting the flow-control trace so as to compensate for the branch mis-prediction.

3. The method according to claim 1, and comprising continuing monitoring the instructions during parallelized execution.

4. The method according to claim 1, and comprising continuing to monitor the instructions and construct the specification after rolling-back the recurring register access.

5. The method according to claim 1, wherein rolling-back the recurring register access comprises terminating monitoring of a segment of the instructions in which the branch mis-prediction occurred, and discarding at least part of the specification of the recurring register access collected in the segment.

6. The method according to claim 1, wherein rolling-back the recurring register access comprises rolling-back the recurring register access, based on the instructions following the branch mis-prediction, to a previous state corresponding to an instruction at or prior to a branch instruction in which the branch mis-prediction occurred.

7. The method according to claim 6, wherein monitoring the instructions comprises recording in the specification a location in the sequence of a last write operation to a register, and wherein rolling-back the recurring register access comprises correcting the location of the last write operation.

8. The method according to claim 7, wherein recording the location of the last write operation comprises incrementing a count of write operations to the register, and wherein correcting the location comprises decrementing the count to a value corresponding to the branch instruction in which the branch mis-prediction occurred.

9. The method according to claim 1, wherein monitoring the instructions comprises recording in the specification a classification of registers accessed by the monitored instructions, and wherein rolling-back the recurring register access comprises re-classifying one or more of the registers so as to compensate for the branch mis-prediction.

10. The method according to claim 1, wherein monitoring the instructions comprises saving one or more states of the specification at or prior to one or more respective branch instructions along a monitored segment of the instructions, and wherein rolling-back the recurring register access comprises reverting to a saved state corresponding to an instruction at or prior to a branch instruction in which the branch mis-prediction occurred.

11. The method according to claim 10, wherein saving the states comprises saving the states only for a partial subset of the branch instructions along the monitored segment.

12. The method according to claim 11, and comprising selecting the partial subset of the branch instructions in accordance with a directive in the program code or from a compiler of the program code.

13. The method according to claim 11, and comprising selecting the partial subset of the branch instructions based on a criterion evaluated at runtime.

14. The method according to claim 1, wherein monitoring the instructions comprises generating a flow-control trace of the monitored instructions based on branch instructions being fetched from memory in an execution pipeline of the processor.

15. The method according to claim 1, wherein monitoring the instructions comprises generating a flow-control trace of the monitored instructions based on branch instructions being decoded in an execution pipeline of the processor.

16. The method according to claim 1, wherein monitoring the instructions comprises generating a flow-control trace of the monitored instructions based jointly on branch instructions being fetched from memory, and on the branch instructions being decoded, in an execution pipeline of the processor.

17. The method according to claim 1, wherein monitoring the instructions comprises recording in the specification a location in the sequence of a last write operation to a register, based on the instructions being decoded in an execution pipeline of the processor.

18. The method according to claim 1, wherein monitoring the instructions comprises recording in the specification a location in the sequence of a last write operation to a register, based on the instructions being executed in an execution pipeline of the processor.

19. The method according to claim 1, wherein monitoring the instructions comprises recording in the specification a location in the sequence of a last write operation to a register, based on the instructions that are committed and are not flushed due to the branch mis-prediction.

20. The method according to claim 1, wherein monitoring the instructions comprises collecting the register access only after evaluating respective branch conditions of conditional branch instructions of the sequence.

21. The method according to claim 1, wherein monitoring the instructions comprises generating a flow-control trace for the monitored instructions, including for a branch instruction that is not known to a branch prediction unit of the processor.

22. A processor, comprising:
an execution pipeline, which is configured to execute instructions of program code; and
a monitoring unit, which is configured to monitor a repetitive sequence of the instructions that exhibits a constant, recurring register access, to construct a specification that specifies the recurring register access, to roll-back the recurring register access specified in the specification in response to detecting a branch mis-prediction in the monitored instructions so as to compensate for a deviation in the recurring register access caused by the branch mis-prediction, and to parallelize execution of at least some of the instructions based on the specification having the rolled-back recurring register access.

23. The processor according to claim 22, wherein the monitoring unit is further configured to generate a flow-control trace traversed by the monitored instructions, and to correct the flow-control trace so as to compensate for the branch mis-prediction.

24. The processor according to claim 22, wherein the monitoring unit is configured to roll-back the recurring register access by terminating monitoring of the instructions of a segment of the instructions in which the branch mis-prediction occurred, and discarding the specification of the register access collected in the segment.

25. The processor according to claim 22, wherein the monitoring unit is configured to roll-back the recurring register access, based on the instructions following the branch mis-prediction, to a previous state corresponding to an instruction at or prior to a branch instruction in which the branch mis-prediction occurred.

26. The processor according to claim 22, wherein the monitoring unit is configured to record in the specification a classification of registers accessed by the monitored instructions, and to roll-back the recurring register access by re-classifying one or more of the registers so as to compensate for the branch mis-prediction.

27. The processor according to claim 22, wherein the monitoring unit is configured to save one or more states of the specification at or prior to one or more respective branch instructions along a monitored segment of the instructions, and to roll-back the recurring register access by reverting to a saved state corresponding to an instruction at or prior to a branch instruction in which the branch mis-prediction occurred.

28. The processor according to claim 22,
   wherein the monitoring unit is configured to generate a flow-control trace of the monitored instructions based on one of:

branch instructions being fetched from memory in the execution pipeline;

the branch instructions being decoded in the execution pipeline; and both the branch instructions being fetched from memory and the branch instructions being decoded.

29. The processor according to claim 22, wherein the monitoring unit is configured to record in the specification a location in the sequence of a last write operation to a register, based on at least one of:

the instructions being decoded in the execution pipeline;

the instructions being executed in the execution pipeline; and the instructions that are committed and are not flushed due to the branch mis-prediction.

30. The processor according to claim 22, wherein the monitoring unit is configured to collect the register access only after evaluating respective branch conditions of conditional branch instructions of the sequence.

\* \* \* \* \*